(12) United States Patent
Buckman et al.

(10) Patent No.: US 10,939,711 B2
(45) Date of Patent: Mar. 9, 2021

(54) NOISE SUPPRESSION DEVICE FOR A PERSONAL IMPACT PROTECTION SYSTEM

(71) Applicant: Active Protective Technologies, Inc., Kennedyville, MD (US)

(72) Inventors: Robert F. Buckman, Elkton, MD (US); Drew Lakatos, Allentown, PA (US); David Perry, Cambridge, MA (US); David Schoon, Stow, MA (US); Wamis Singhatat, Malvern, PA (US); Jon Wenderoth, Boston, MA (US)

(73) Assignee: ACTIVE PROTECTIVE TECHNOLOGIES, INC., Kennedyville, MD (US)

( * ) Notice: Subject to any disclaimer, the term of this patent is extended or adjusted under 35 U.S.C. 154(b) by 105 days.

(21) Appl. No.: 15/762,925

(22) PCT Filed: Sep. 23, 2016

(86) PCT No.: PCT/US2016/053475
§ 371 (c)(1),
(2) Date: Mar. 23, 2018

(87) PCT Pub. No.: WO2017/053819
PCT Pub. Date: Mar. 30, 2017

(65) Prior Publication Data
US 2018/0263305 A1 Sep. 20, 2018

Related U.S. Application Data

(60) Provisional application No. 62/232,872, filed on Sep. 25, 2015.

(51) Int. Cl.
*A41D 13/018* (2006.01)
*B60R 21/261* (2011.01)
(Continued)

(52) U.S. Cl.
CPC .............. *A41D 13/018* (2013.01); *B32B 1/08* (2013.01); *B32B 3/266* (2013.01); *B32B 5/024* (2013.01);
(Continued)

(58) Field of Classification Search
CPC .... A41D 13/018; A41D 2500/20; B32B 1/08; B32B 2255/02; B32B 2255/26;
(Continued)

(56) References Cited

U.S. PATENT DOCUMENTS 3,769,780 A   11/1973   Kasten
5,865,462 A    2/1999   Robins et al.
(Continued)

FOREIGN PATENT DOCUMENTS

CN          101171160 A      4/2008
DE     10 2008 003 635 A1   10/2008
(Continued)

OTHER PUBLICATIONS

Supplementary European Search Report in Application No. 16 84 9764 dated Mar. 19, 2019, 8 pages.
(Continued)

*Primary Examiner* — Arti Singh-Pandey
(74) *Attorney, Agent, or Firm* — Foley & Lardner LLP

(57) ABSTRACT

Systems including noise suppression devices for personal impact protection systems are provided. One such system includes an inflator having an inflator discharge port; a flexible permeable inner tube configured to receive gas from the inflator via the inflator discharge port; and a flexible outer tube surrounding the inner tube and configured to receive gas from the inner tube, the outer tube including one or more outer tube discharge ports. Another such system includes an inflator having an inflator discharge port; a flexible non-permeable tube configured to receive gas from (Continued)

the inflator via the inflator discharge port; and a permeable gas diffuser element disposed in or adjacent to the tube, the diffuser element being configured to receive gas from the inflator via the inner tube.

28 Claims, 13 Drawing Sheets

(51) Int. Cl.
*B32B 1/08* (2006.01)
*B32B 3/26* (2006.01)
*B32B 5/02* (2006.01)
*B32B 5/26* (2006.01)
*G10K 11/162* (2006.01)

(52) U.S. Cl.
CPC .............. *B32B 5/26* (2013.01); *B60R 21/261* (2013.01); *G10K 11/162* (2013.01); *A41D 2500/20* (2013.01); *B32B 2255/02* (2013.01); *B32B 2255/26* (2013.01); *B32B 2262/0261* (2013.01); *B32B 2262/0269* (2013.01); *B32B 2262/0276* (2013.01); *B32B 2307/102* (2013.01); *B32B 2307/7242* (2013.01); *B32B 2437/00* (2013.01); *B32B 2571/00* (2013.01); *B32B 2597/00* (2013.01)

(58) Field of Classification Search
CPC .... B32B 2262/0261; B32B 2262/0269; B32B 2262/0276; B32B 2307/102; B32B 2307/7242; B32B 2437/00; B32B 2571/00; B32B 2597/00; B32B 3/266; B32B 5/024; B32B 5/26; B60R 21/261; G10K 11/162
See application file for complete search history.

(56) References Cited

U.S. PATENT DOCUMENTS

| 7,267,365 | B2 | 9/2007 | Quioc |
| 7,850,202 | B2 | 12/2010 | Boxey et al. |
| 2004/0183283 | A1 | 9/2004 | Buckman et al. |
| 2006/0208467 | A1 | 9/2006 | Khouri |
| 2006/0255570 | A1 | 11/2006 | Wipasuramonton et al. |
| 2008/0235854 | A1 | 10/2008 | Orita et al. |

FOREIGN PATENT DOCUMENTS

| DE | 10 2008 024 937 A1 | 12/2009 |
| WO | WO-00/32447 A1 | 6/2000 |

OTHER PUBLICATIONS

International Preliminary Report on Patentability in PCT/US2016/053475 dated Apr. 5, 2018, 11 pages.
Office Action dated Nov. 11, 2019 in corresponding Chinese application No. 201680065990.4, 10 pages and English translation (8 pages).
International Search Report in PCT/US2016/053475 dated Feb. 3, 2017, 4 pages.
Written Opinion of the International Searching Authority in PCT/US2016/053475 dated Feb. 3, 2017, 9 pages.
Office Action dated Jun. 10, 2020 in corresponding Chinese application No. 201680065990.4 (21 pages) and English machine translation (30 pages).
Office Action received in corresponding Japanese Application No. 2018-515973 dated Nov. 4, 2020, (5 pages) and English translation (4 pages).

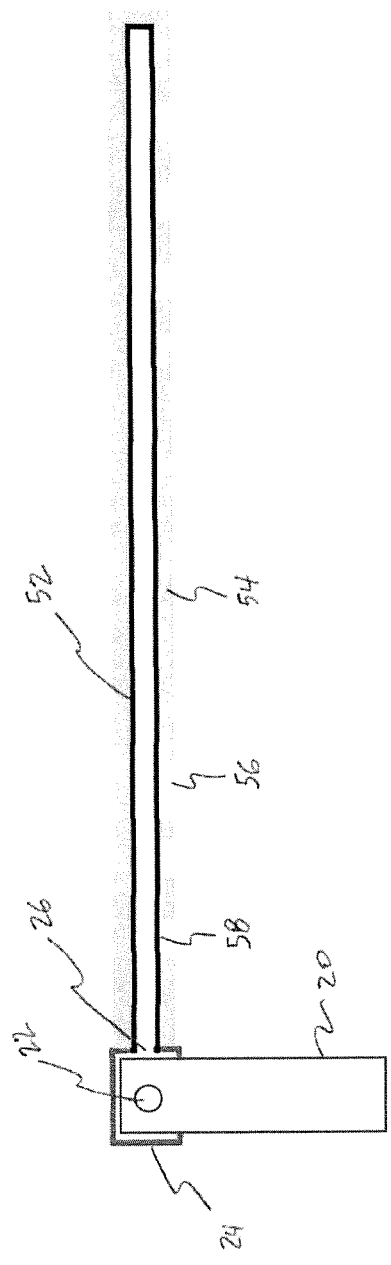

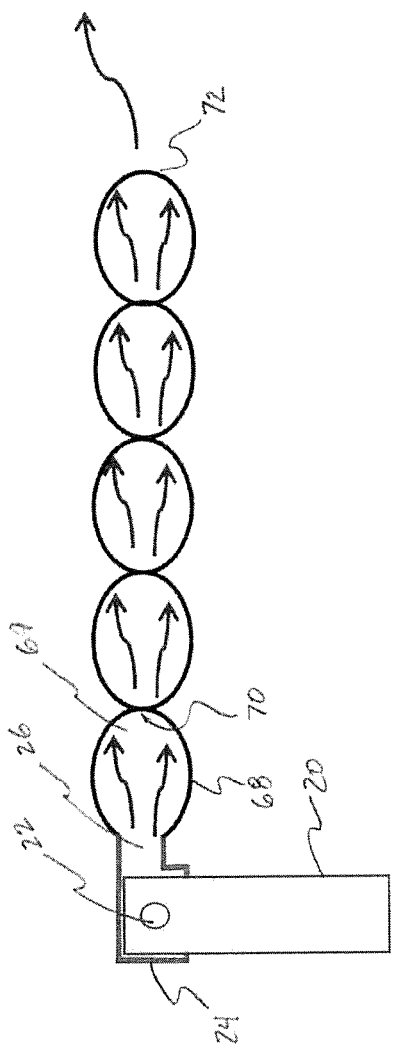

NOISE SUPPRESSION DEVICE FOR A PERSONAL IMPACT PROTECTION SYSTEM

CROSS-REFERENCE TO RELATED APPLICATIONS

The present application is a U.S. National Stage of International Application No. PCT/US2016/053475 filed on Sep. 23, 2016, which claims the benefit of U.S. Provisional Patent Application No. 62/232,872 filed on Sep. 25, 2015, the entire disclosures of all of which are incorporated herein by reference.

BACKGROUND

The present disclosure relates to noise suppression devices for personal impact protection systems.

The use of inflatable airbags/cushions to protect individuals from impact (e.g., automotive airbags) is known in the art. Applications of this technology to the protection of ambulating individuals, in particular, elderly individuals that are prone to falls, is a more recent development. For example, U.S. Pat. No. 7,017,195, issued on Mar. 28, 2006, U.S. Pat. No. 7,150,048, issued on Dec. 19, 2006, and U.S. Pat. No. 9,107,615, issued on Aug. 18, 2015, all assigned to the same assignee as the present application, and all incorporated herein by reference in their entireties, describe active protective garments and motion analysis systems for protecting individuals from falls.

Deployment of active protective devices to attenuate impact and fall-related injuries in the elderly presents unique problems, one of which is the need to deploy such devices in such a way not to startle or alarm the wearer or bystanders by loud sounds. Loud sounds attend the rapid release of gas from canisters, pyrotechnics, or other inflating devices. Pressurization of cold gas inflators applicable to some active protective devices can range from 600 to 8000 psi, and the release of this gas must be accomplished within timeframes of often less than 200 milliseconds. This can result in creation of very loud sounds, for example, on the order of 150 decibels or more. Such sounds are detrimental in devices intended for use in nursing homes, hospitals, managed care facilities, etc., as well as in the home environment. While sound attenuation mechanisms have been disclosed for firearms, automobile exhaust, and other various industrial applications, sound attenuation of inflators for personal airbags/cushions are as yet unknown. To achieve a practical solution to the suppression of loud noises associated with the deployment of personal protective airbags/cushions, certain restrictions that do not apply to sound suppression technology utilized in firearm, automotive, or industrial applications are required, such as size, weight, and conformation to human anatomy.

SUMMARY OF INVENTION

One object of certain embodiments of the present invention is to address the above-mentioned problems by providing a noise suppression device that can suppress or attenuate the noise caused by typical inflating devices used in personal impact protection systems. Another object of certain embodiments of the present invention is to provide such a device in a form that is adaptable for use in flexible garments to be worn by an individual for whom personal protection is desired.

The present disclosure describes practical devices for suppressing the loud sounds associated with discharges of gas from chemical, pyrotechnic, or stored gas inflation sources, and in particular, the sufficient suppression of such sounds for a personal protective airbag/cushion. In certain embodiments of the present invention, this object is achieved by a combination of gas restriction, dissipation, baffling, and expansion containment, alone or in combination, and with a configuration of light weight and low bulk, conformable to human anatomy.

In one embodiment, a system includes an inflator having an inflator discharge port; a flexible permeable inner tube configured to receive gas from the inflator via the inflator discharge port; and a flexible outer tube surrounding the inner tube and configured to receive gas from the inner tube, the outer tube including one or more outer tube discharge ports.

In another embodiment, a system includes an inflator having an inflator discharge port; a flexible non-permeable tube configured to receive gas from the inflator via the inflator discharge port; and a permeable gas diffuser element disposed in or adjacent to the tube, the diffuser element being configured to receive gas from the inflator via the inner tube.

In another embodiment, a system includes an inflator having an inflator discharge port; a housing affixed to the inflator, the housing including a radial extension; and a permeable gas diffuser plug disposed in the radial extension of the housing. The system is configured such that gas exiting the inflator discharge port enters the housing and then exits the housing via the permeable gas diffuser plug disposed in the radial extension of the housing.

In another embodiment, a system includes an inflator having an inflator discharge port; a sacrificial inner tube configured to receive gas from the inflator via the inflator discharge port; and an outer tube surrounding the inner tube, the outer tube including one or more outer tube discharge ports, and a hoop strength of a material of the outer tube being higher than a hoop strength of a material of the inner tube. The system is configured such that gas exiting the inflator discharge port enters the when a pressure in the inner tube reaches a sufficient value, the inner tube ruptures at locations corresponding to the one or more outer tube discharge ports, thereby releasing gas through the one or more outer tube discharge ports.

In another embodiment, an inflator includes a first inflator discharge port; and a plurality of second inflator discharge ports. A diameter of the second inflator discharge ports is smaller than a diameter of the first inflator discharge ports.

In another embodiment, an inflator includes an internal orifice through which gas is releasable; a plurality of internal baffling element; and an inflator discharge port. The inflator is configured such that, upon being released through the internal orifice, gas travels across the plurality of internal baffling elements before exiting the inflator discharge port.

In another embodiment, a system includes an inflator having an inflator discharge port; and a flexible, non-permeable, segmented tube configured to receive gas from the inflator via the inflator discharge port, the tube including a tube discharge port located at an end of the tube opposite the inflator. The tube comprises a plurality of chambers that are communicably linked to one another via a burst seam, such that gas discharged from the inflator enters the tube and moves through the chambers via one or more respective burst seam.

In another embodiment, a device includes an inflator having an inflator discharge port; a housing surrounding the inflator, the housing defining an air chamber and including a housing discharge port; and a plurality of internal baffling elements disposed in the air chamber. The device is configured such that gas discharged from the inflator discharge port flows through the air chamber past the plurality of internal baffling element before exiting the housing discharge port.

In another embodiment, a system includes an inflator having an inflator discharge port; a flexible non-permeable inner tube configured to receive gas from the inflator via the inflator discharge port; an outer tube surrounding the inner tube and defining an elongated chamber between the inner tube and the outer tube, and outer tube including a plurality of outer tube discharge ports; and an end cap connecting an end of the inner tube opposite the inflator to an end of the outer tube opposite the inflator. The system is configured such that gas discharged from the inflator discharge port flows through the inner tube and passes through the elongated chamber defined by the outer tube before exiting the outer tube discharge ports.

BRIEF DESCRIPTION OF THE DRAWINGS

The foregoing summary, as well as the following detailed description of illustrative embodiments of the present invention, will be better understood when read in conjunction with the appended drawings. It should be understood, however, that the application is not limited to the precise arrangements and configurations shown.

FIG. 4 is a left side sectional view of a fourth embodiment of an inflator and noise suppressor assembly;

FIG. 6 is a left side sectional view of a sixth embodiment of an inflator and noise suppressor assembly;

DETAILED DESCRIPTION

Figure 1:
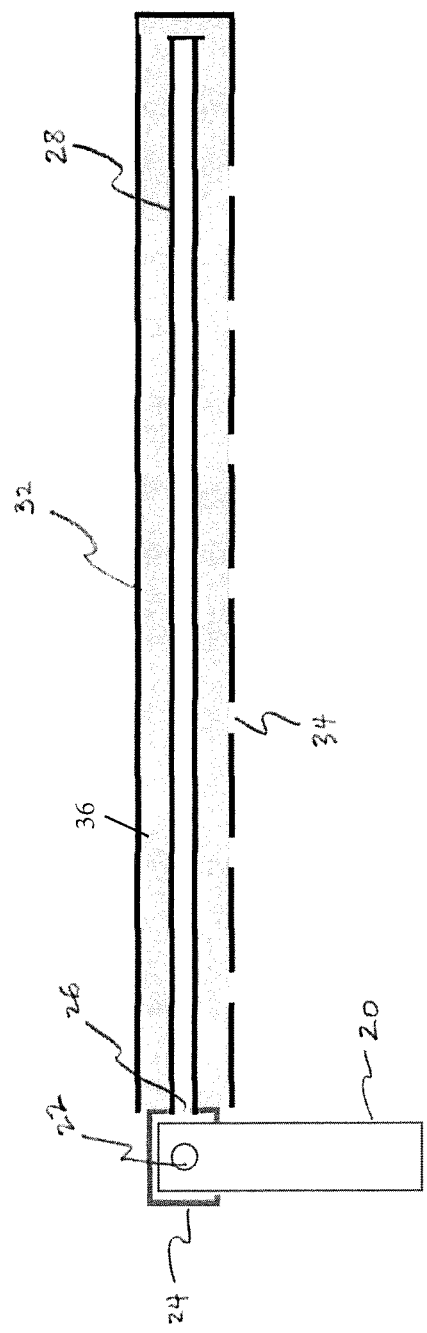
FIG. 1 is a left side sectional view of a first embodiment of an inflator and noise suppressor assembly.

Referring to FIG. 1, an illustrative inflator and noise suppression assembly is depicted, in which an inflator 20 with at least one inflator discharge port 22 is affixed to housing 24. The inflator may be, for example, a compressed gas canister, or may be a high pressure gas source with a solid or liquid material that is catalytically or pyrotechnically made to undergo a reaction, such as oxidation, that releases an amount of gas sufficient to develop a predetermined pressure. Inflation may also be achieved through a combination of chemical reaction as well as compressed gas contained in the same housing. Housing 24 is comprised of a material sufficient to withstand pressure of contained gas and release of that gas or reaction of inflation chemicals. This material may be, for example, steel, aluminum, an engineered polymer, or a composite material such as carbon fiber. Housing 24 is securely affixed to a flexible permeable inner tube 28 which, upon inflator activation as necessary to inflate a personal airbag/cushion, serves to provide a first chamber for inflator discharge gas to exit from housing discharge port 26 and at least partially expand along the length of permeable inner tube 28, thereby at least partially dissipating the impulse of inflator discharge gas. The permeable inner tube 28 may be composed of a woven polyester, nylon, Kevlar, metallic fiber or other high-tensile strength textile, such that the density of fibers within its woven structure create a porosity sufficient to allow inflator discharge gas to permeate through its wall, thereby further dissipating the impulse of inflator discharge gas. Further, permeable inner tube 28 may take on an initial shortened, folded configuration such that discharge of inflator gas unfolds and lengthens permeable inner tube 28 to further dissipate the impulse of inflator discharge gas. Surrounding permeable inner tube 28 is a flexible outer tube 32, which forms a second chamber for inflator discharge gas to exit from permeable inner tube 28 and expand along the length of outer tube 32, thereby further dissipating the impulse of inflator discharge gas. The outer tube 32 may be composed of a woven polyester, nylon, Kevlar, or other textile with or without an impermeable inner coating composed materials such as polyurethane, natural rubber, silicone and others. The outer tube 32 contains one or more outer tube discharge ports 34. Optionally, interspersed between permeable inner tube 28 and outer tube 32 may be a sound absorption layer 36, which may be comprised of any number of materials such as fiberglass, aerogel, felt, an aramid fiber such as Kevlar, another aramid material such as Nomex, open-cell foam, polybenzobisoxazole, and the like, alone or in combination, to further dissipate energy produced by inflator discharge gas exiting from permeable inner tube 28 prior to exiting from the at least one outer tube discharge port 34 to inflate a personal airbag/cushion. Sound absorption layer 36 may alternatively be comprised of at least one tubular layer of a strong permeable woven fabric to impart a similar effect as permeable inner tube 28 to dissipate and decelerate inflator discharge gas.

Figure 2:
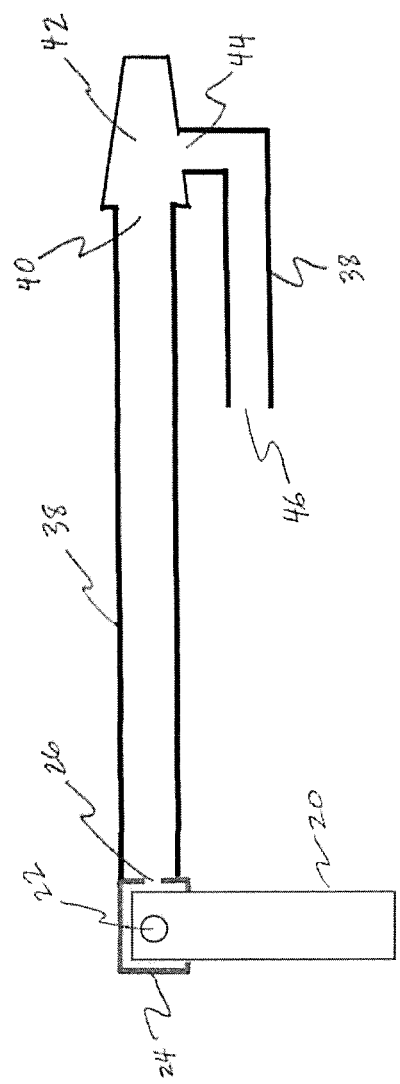
FIG. 2 is a left side sectional view of a second embodiment of an inflator and noise suppressor assembly.

Referring to FIG. 2, another illustrative inflator and noise suppression assembly is depicted, in which an inflator 20 with at least one inflator discharge port 22 is affixed to housing 24. Housing 24 is securely affixed to non-permeable tube 38 which, upon inflator activation as necessary to inflate a personal airbag/cushion, serves to provide a chamber for inflator discharge gas to exit from housing discharge port 26 and expand along the length of tube 38, thereby at least partially dissipating the impulse of inflator discharge gas. Tube 38 further contains along its length, or is adjacent to, at least one permeable gas diffuser element 42 to further dissipate the impulse of the inflator discharge gas, in a manner such that discharge gas enters restrictor element 42 via inlet port 40, travels through diffuser element 42, and exits via outlet port 44, prior to releasing into a personal airbag/cushion via tube discharge port 46. Optionally, an additional length of the non-permeable tube 38 may be provided between the gas diffuser element 42 and the discharge port 46. Optionally, the additional length of non-permeable tube 38 and the discharge port may be omitted, so that gas enters the personal airbag/cushion directly from the gas diffuser element. Permeable gas diffuser element 42 may be made of, for example, porous metal foam, tightly woven metal or non-metal screens, and the like. Alternatively, permeable gas diffuser element 42 may be a composite structure comprised of an outer permeable enclosure housing a number of smaller restrictive elements, such as polymeric foam beads, elastomeric beads, sand, vermiculite beads, and glass beads to provide a suitable noise attenuating medium within the enclosure.

Figure 3:
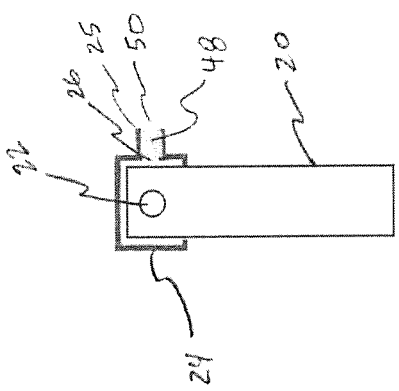
FIG. 3 is a left side sectional view of a third embodiment of an inflator and noise suppressor assembly.

Referring to FIG. 3, another illustrative inflator and noise suppression assembly is depicted, in which an inflator 20 with at least one inflator discharge port 22 is affixed to housing 24. Housing 24 incorporates a radial extension 25 communicating with housing discharge port 26 which, upon inflator activation as necessary to inflate a personal airbag/cushion, serves to channel inflator discharge gas through permeable gas diffuser plug 48 and out radial exchange discharge port 50, thereby dissipating and decelerating the impulse of inflator discharge gas prior to it releasing into a personal airbag/cushion. Permeable gas diffuser plug 48 may be made of, for example, similar materials as aforementioned for permeable gas diffuser element 42.

Referring to FIG. 4, another illustrative inflator and noise suppression assembly is depicted, in which an inflator 20 with at least one inflator discharge port 22 is affixed to housing 24. Housing 24 is securely affixed to a sacrificial inner tube 52 made of a non-permeable or slightly permeable material, and sealed to create a pressure vessel. Sacrificial inner tube 52 further provides, upon inflator activation as necessary to inflate a personal airbag/cushion, a chamber for inflator discharge gas to exit from housing discharge port 26 and expand along the length of sacrificial inner tube 52, thereby at least partially dissipating the impulse of inflator discharge gas. Surrounding and in close contact with sacrificial inner tube 52 is outer tube 54, which has radial and hoop strength stronger than that of sacrificial inner tube 54, and which further has at least one outer tube discharge port 56 positioned at its end or along its length. The outer tube 54 may be composed of a woven polyester, nylon, kevlar, or other textile with or without an impermeable inner coating composed materials such as polyurethane, natural rubber, butyl rubber, silicone, and others. The sacrificial inner tube 52 may be a lighter weight woven textile of similar composition to the outer layer, or it may be an elastomer such as polyurethane, natural rubber, butyl rubber, silicone, and others without any textile reinforcement. Bursting pressure of the outer tube 54 will be significantly greater than that of the sacrificial inner tube 52. An example of bursting pressure relationship is an outer tube 54 with a bursting pressure of 1200 PSI and a sacrificial inner tube 52 with a bursting pressure of 200 PSI. Exact bursting pressure ratio may be less or significantly more than this. Each of the at least one outer tube discharge ports 56 creates a weak point 58 in the overlying wall of sacrificial inner tube 52, such that upon reaching sufficient pressurization of sacrificial inner tube 52, each of the at least one weak points 58 will rupture, thereby releasing inflator discharge gas through the at least one outer tube discharge port 26, thereby further dissipating and decelerating the impulse of inflator discharge gas prior to it releasing into a personal airbag/cushion.

Figure 5A:
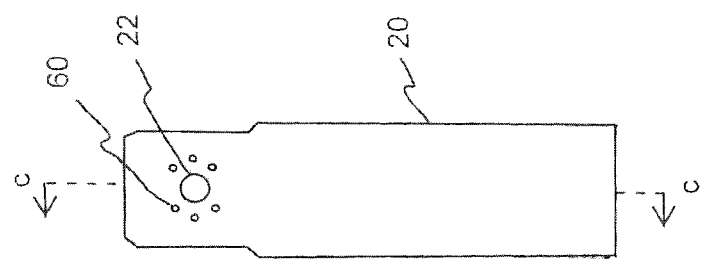
FIG. 5a is a left side elevation view of a fifth embodiment of an inflator incorporating a noise suppression device.

Referring to FIG. 5a, an inflator 20 incorporating noise suppression means is depicted, whereby a plurality of inflator discharge ports can be configured in such a manner that at least one larger inflator discharge port 22 can be oriented within an array of smaller inflator discharge ports 60. The number, diameters, orientation, and positioning of discharge ports 22 and 60 can be designed to produce a defined overall acoustic frequency which would be effectively attenuated by a device employed downstream of the discharge ports 22 and 60.

Figure 5B:
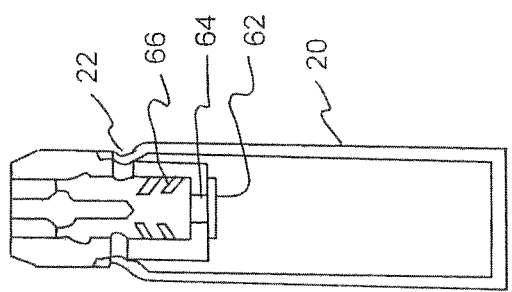
FIG. 5b is a vertical sectional view taken along line c-c of FIG. 5a, showing a fifth embodiment of an inflator incorporating a internal noise suppression device.

Referring to FIG. 5b, a cold gas inflator 20 incorporating an internal noise suppression mechanism is depicted, whereby upon triggering opening of burst disc 62 as necessary to inflate a personal airbag/cushion, inflator discharge gas is released through internal orifice 64, travels across internal baffling elements 66, which dissipate and decelerate the impulse of inflator discharge gas and also reduce noise through the principle of resonant absorption, prior to exiting the inflator 20 through the at least one inflator discharge port 22. It should be appreciated by those skilled in the art that internal baffling elements 66 can be replaced with or used in combination with other devices and materials for noise attenuation, such as a porous metal foam diffuser.

Referring now to FIG. 6, another illustrative inflator and noise suppression assembly is depicted, in which an inflator 20 with at least one inflator discharge port 22 is affixed to housing 24. Housing 24 is securely affixed to a flexible, non-permeable segmented tube 68 comprising a plurality of sequential chambers 69, with each sequential chamber 69 communicably linked to one another via burst seam 70. Burst seam 70 may be sealed to provide a sacrificial barrier between sequential chambers 69, may be partially open to restrict air flow between sequential chambers 69, or may be configured in a combination of both types along the length of segmented tube 68.

In an embodiment employing partially open burst seams 70, each sequential chamber 69 provides a defined volume for at least partial expansion of inflator discharge gas, which is sequentially stepped down in pressure upon gas passing through each sequential chamber 69 and busting each partially open burst seam 70 and final burst seam 72, thereby dissipating and decelerating the impulse of gas prior to its release into a personal airbag/cushion. Further, this embodiment may optionally include an elongated flexible tubular structure (not shown) located along the lumen of segmented tube 68 to maintain a consistent gas flow path along the length of segmented tube 68. Flexible tubular structure 68 could be in the shape of a coiled spiral tube, such that inflator discharge gas can travel through and between each coil of its spiral structure.

The embodiment depicted in FIG. 6 can alternatively employ sealed, sacrificial burst seams 70 based on a similar principle described above for when the burst seam 70 is partially open; however, the use of sacrificial burst seams 70 would provide even further restriction to gas flow, thereby further dissipating and decelerating the impulse of inflator discharge gas.

Alternatively, burst seam 70 may be configured as a one way valve, such that inflator discharge gas would open the burst seam, and flow in the direction opposite the discharge flow would close the valve. In this configuration, the valve-type burst seam 70 would provide dual purposes of restricting and dissipating the impulse of inflator discharge gas and also preventing backflow of inflator discharge gas.

Regardless of the type of burst seam 70 used, sequential chambers 69 may be variable in size, such that a chamber near the inflator defines, for example, a larger volume than a chamber towards the opposite end of segmented tube 68, thereby allowing for greater expansion of inflator discharge gas nearer the at least one inflator discharge port 22.

Figure 7:
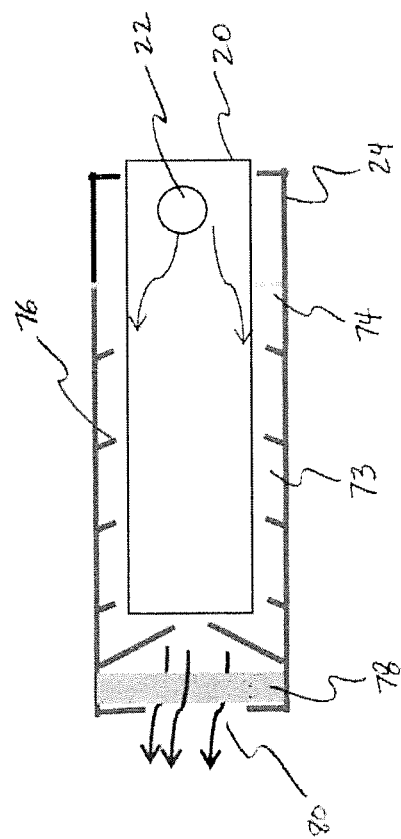
FIG. 7 is a left side sectional view of a seventh embodiment of an inflator and noise suppressor assembly.

Referring to FIG. 7, another illustrative inflator and noise suppression assembly is depicted, in which an inflator 20 with at least one inflator discharge port 22 is surrounded by housing 24 defining an air chamber 73 between the inner surface of housing 24 and the outer surface of inflator 20. The housing 24 may be concentric around the inflator 20. Further, housing 24 is sealably affixed at or near one of end of inflator 20, such that, upon activation of inflator 20 as necessary to inflate a personal airbag/cushion, inflator discharge gas is forcibly directed through air chamber 73 and exits through housing discharge port 80. Air chamber 73 may incorporate internal baffling elements 76, which dissipate and decelerate the impulse of inflator discharge gas and also reduce noise through the principle of resonant absorption. It should be appreciated by those skilled in the art that internal baffling elements 76 can be replaced with or used in combination with other means and materials for noise attenuation, such as a porous metal foam diffuser element 78 situated at or near concentric housing discharge port 80.

Figure 11:
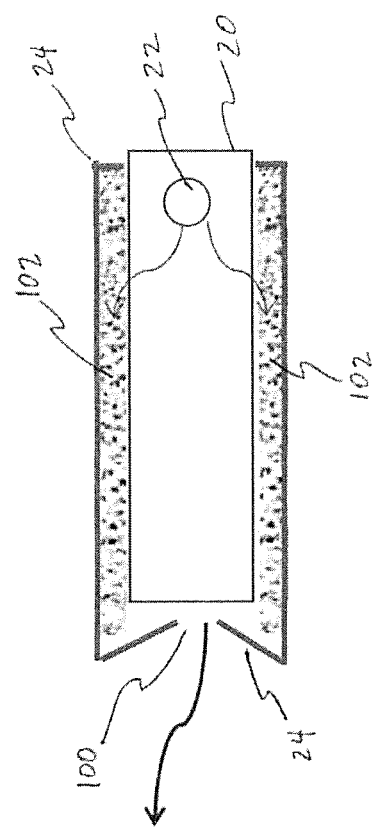
FIG. 11 is a left side sectional view of an eleventh embodiment of an inflator and noise suppressor assembly.

An alternative embodiment is depicted in FIG. 11, which replaces internal baffling elements 76 with a unitary porous diffuser tube 102, such that inflator discharge gas is forcibly directed through diffuser tube 102 prior to exiting via concentric housing discharge port 100.

Figure 8:
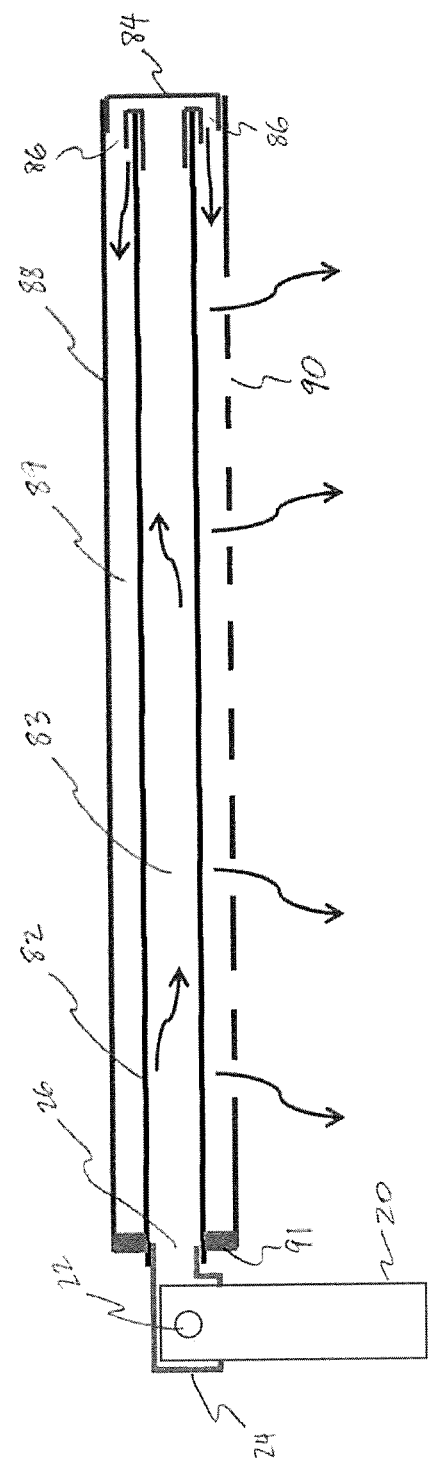
FIG. 8 is a left side sectional view of an eighth embodiment of an inflator and noise suppressor assembly.

Referring to FIG. 8, another illustrative inflator and noise suppression assembly is depicted, in which an inflator 20 with at least one inflator discharge port 22 is affixed to housing 24. Housing 24 is securely affixed to a flexible non-permeable inner tube 82, which provides an elongated first chamber 83 to receive inflator discharge gas. Further, inner tube 82, at its end opposite from housing 24, is securely affixed to an end cap 84 containing at least one air channel 86. End cap 84 is further affixed to flexible outer tube 88, which surrounds the inner tube 82 and serves to provide an elongated second chamber 89, which communicates with the at least one air channel 86. The flexible outer tube 88 may be concentric with the flexible non-permeable inner tube 82. Outer tube 88 terminates at or near inflator housing 24 and is securely affixed to inner tube 82 with a non-permeable sealing member 91. Further, outer tube 88 contains at least one outer tube discharge port 90, which communicates with second chamber 89. End cap 84 may optionally contain elements to provide resonant absorption such as internal baffling elements 76 depicted in FIG. 7.

Referring still to FIG. 8, upon inflator activation as necessary to inflate a personal airbag/cushion, inflator discharge gas is released from housing discharge port 26 and expands into first chamber 83, thereby at least partially dissipating the impulse of inflator discharge gas. Inflator discharge gas further travels into end cap 84 and through the at least one air channel 86, which provides further restrictive dissipation of inflator discharge gas. Inflator discharge gas then expands further into second chamber 89, thereby further dissipating the impulse of inflator discharge gas, prior to releasing into a personal airbag/cushion.

It should be appreciated by those skilled in the art that with each gas expansion chamber, redirection of gas, baffling elements, and restrictive element within the gas flow path, the impulse of inflator discharge gas is further dissipated and decelerated, thereby further suppressing the inflator discharge noise. Thus, the embodiment shown in FIG. 8 can optionally be expanded to include additional flexible concentric tubes which provide additional expansion chambers, connected in series to one another via additional air channels 86 incorporated into end caps 84, which are employed at each end of the construct.

Figure 9:
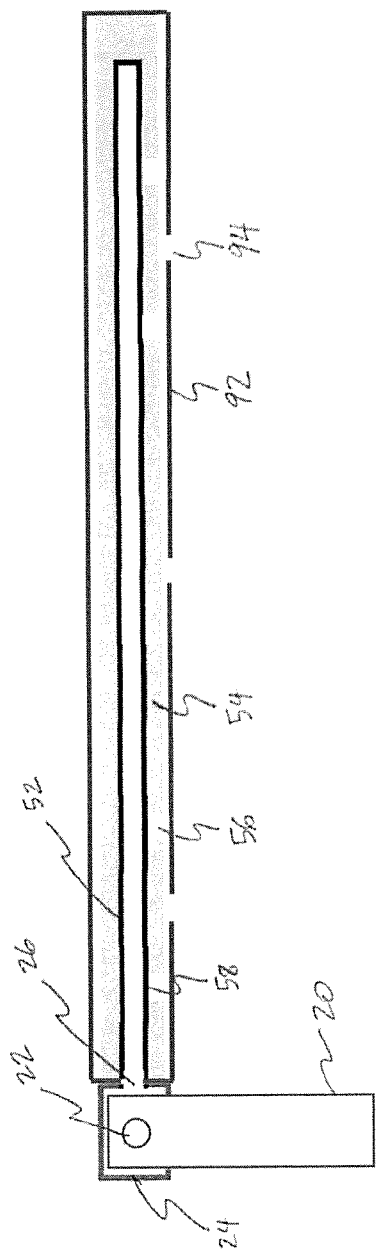
FIG. 9 is a left side sectional view of a ninth embodiment of an inflator and noise suppressor assembly.

In a similar fashion, FIG. 9 depicts an alternative to the embodiment disclosed in FIG. 4, whereby an additional flexible outer tube 92 with at least one outer tube discharge port 94 is incorporated to provide a further expansion chamber and further gas redirection prior to allowing inflator discharge gas to be released into a personal airbag/cushion.

Referring still to FIG. 9, if outer tube 92 contains more than one outer tube discharge port 94, each port may optionally have variable restrictive capacity, such that the pressure and inflator gas discharge rate at each port would be approximately similar along the lengths of inner tube 52 and outer tube 92. Variable restrictive capacity could be accomplished, for example, by having smaller diameters of outer tube discharge port 94 toward the inflator 20 and progressively larger diameters toward the end opposite inflator 20. This principle may be applied to any embodiment within this disclosure which utilizes a plurality of gas discharge ports and/or gas diffuser elements within a tube along which inflator discharge gas is directed to flow.

Figure 10:
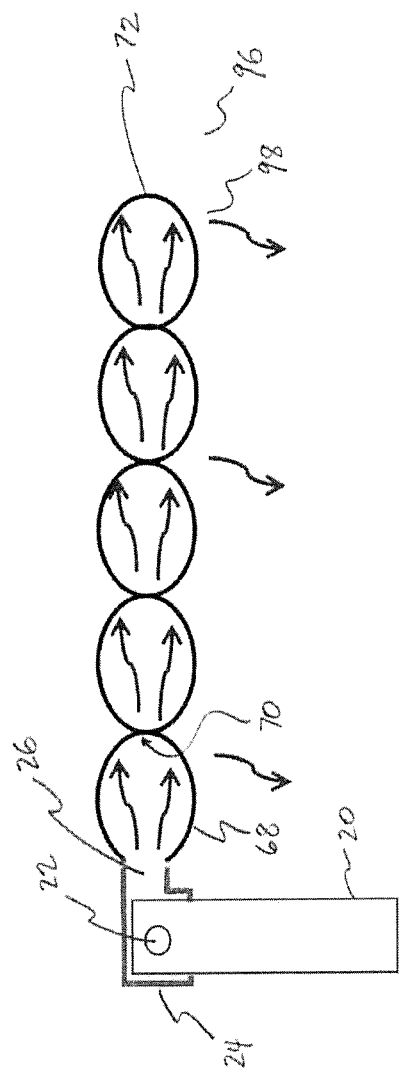
FIG. 10 is a left side sectional view of a tenth embodiment of an inflator and noise suppressor assembly.

Likewise, FIG. 10. depicts an alternative to the embodiment disclosed in FIG. 6, whereby an additional flexible outer tube 96 with at least one outer tube discharge port 98 is incorporated to provide a further expansion chamber and further gas redirection prior to allowing inflator discharge gas to be released into a personal airbag/cushion.

It should be appreciated by those skilled in the art that while embodiments in FIGS. 1, 2, 4, 6, 8, 9, and 10 are shown in a straightened configuration for the purposes of illustrating their cross-sectional geometries, each of these embodiments will have an overall flexibility suitable to comfortably conform to the outer contours of human anatomy when comprised within a personal impact protection system. Further, this overall flexibility would enable each of these embodiments to be substantially collapsible in a pre-deployed state, and upon inflation, expandable to a deployed state. Such expansion would in itself dynamically create a defined volume within each expanded chamber for inflator discharge gas to expand, thereby at least partially dissipating and decelerating the impulse of inflator discharge gas.

Figure 12:
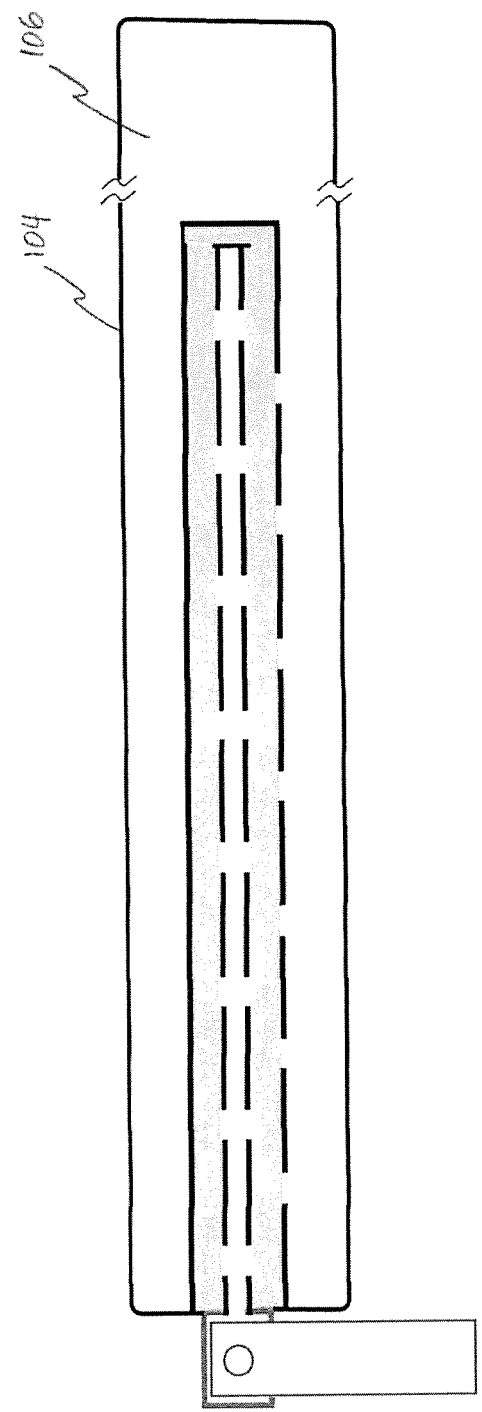
FIG. 12 is a left side sectional view of the inflator and noise suppressor assembly depicted in FIG. 1, shown assembled within a personal airbag/cushion.

Referring now to FIG. 12, the embodiment depicted in FIG. 1. is shown assembled within a personal airbag/cushion 104 which defines an airbag chamber 106. It should be appreciated by those skilled in the art such a noise suppressor device assembled within a personal airbag/cushion 104 would provide further noise attenuation effects. This would be accomplished as follows. Upon inflator activation as necessary to inflate a personal airbag/cushion, as inflator discharge gas progresses down the lumen of inner tube 28, it is incrementally released through outer tube discharge ports 34, beginning nearer housing 24 and progressing towards the end opposite housing 24. This progressive discharge gradually increases the pressure within airbag chamber 106, such that, upon release of the impulse of inflator discharge gas, the pressure differential between the airbag chamber 106 and at the outer tube discharge port 34 is reduced. Since the sound is proportional to this pressure differential, reducing this differential further suppresses the noise caused by discharging the inflator.

It will be appreciated by those skilled in the art that changes could be made to the embodiments described above without departing from the broad inventive concept thereof. Furthermore, it should be appreciated that the structure, features, and methods as described above with respect to any of the embodiments described herein can be incorporated into any of the other embodiments described herein unless otherwise indicated. It is understood, therefore, that this invention is not limited to the particular embodiments disclosed, but it is intended to cover modifications within the spirit and scope of the present disclosure. Furthermore, it should be appreciated that while the aforementioned embodiments are directed towards noise suppression means for personal impact protection systems, the aforementioned invention is not limited to this particular indication, and could be useful in any indication requiring suppression of a gas-based noise source occurring on or in close proximity to an individual or group of individuals.

What is claimed is:

1. A system comprising:
an inflator having an inflator discharge port;
a flexible permeable inner tube configured to receive gas from the inflator via the inflator discharge port, wherein the inner tube comprises a woven material; and
a flexible outer tube surrounding the inner tube and configured to receive gas from the inner tube, wherein the outer tube comprises a woven material through which a plurality of outer tube discharge ports extend.

2. The system of claim 1, wherein the inner tube comprises a woven polyester, nylon, aramid fiber, and/or metallic fiber.

3. The system of claim 2, wherein the inner tube is configured to have an initial folded configuration such that discharge of inflator gas unfolds and lengthens the inner tube to dissipate an impulse of the inflator gas.

4. The system of claim 1, wherein the outer tube comprises a woven polyester, nylon, and/or aramid fiber.

5. The system of claim 1, wherein the outer tube discharge ports are spaced in an axial direction along a length of the outer tube.

6. The system of claim 5, wherein:
the plurality of outer tube discharge ports includes a first outer tube discharge port and a second outer tube discharge port,
a distance between the second outer tube discharge port and the inflator is greater than a distance between the first outer tube discharge port and the inflator, and
a diameter of the second outer tube discharge port is greater than a diameter of the first outer tube discharge port.

7. The system of claim 1, the outer tube comprises an impermeable inner coating.

8. The system of claim 7, wherein the impermeable inner coating comprises polyurethane, natural rubber, and/or silicone.

9. The system of claim 1, further comprising a sound absorption layer disposed between the inner tube and the outer tube.

10. The system of claim 9, wherein the sound absorption layer comprises fiberglass, aerogel, felt, aramid fiber, open-cell foam, and/or polybenzobisoxazole.

11. The system of claim 9, wherein the sound absorption layer comprises a permeable woven fabric.

12. The system of claim 1, further comprising a housing connecting the inner tube to the inflator.

13. The system of claim 1, further comprising:
an airbag or cushion,
wherein the airbag or cushion is configured to receive gas from the outer tube via the outer tube discharge ports.

14. A garment comprising:
the system of claim 1; and
an airbag or cushion,
wherein the airbag or cushion is configured to receive gas from the outer tube via the outer tube discharge ports.

15. A system comprising:
an inflator having an inflator discharge port;
a sacrificial inner tube configured to receive gas from the inflator via the inflator discharge port; and
an outer tube surrounding the inner tube, the outer tube including one or more outer tube discharge ports, and a hoop strength of a material of the outer tube being higher than a hoop strength of a material of the inner tube,
wherein the system is configured such that gas exiting the inflator discharge port enters the inner tube, and when a pressure in the inner tube reaches a sufficient value, the inner tube ruptures at locations corresponding to the one or more outer tube discharge ports, thereby releasing gas through the one or more outer tube discharge ports.

16. The system of claim 15, wherein the outer tube includes a plurality of the outer tube discharge ports spaced in an axial direction along a length of the inner tube.

17. The system of claim 15, wherein:
the outer tube is a first outer tube, and the outer tube discharge ports are first outer tube discharge ports,
the system further comprises a second outer tube surrounding the first outer tube and configured to receive gas from the first outer tube via the first outer tube discharge ports, the second outer tube including one or more second outer tube discharge ports.

18. The system of claim 17, wherein:
the first outer tube includes a plurality of the first outer tube discharge ports spaced in an axial direction along a length of the first outer tube, and
the second outer tube includes a plurality of the second outer tube discharge ports spaced in an axial direction along a length of the second outer tube.

19. The system of claim 18, wherein the second outer tube discharge ports are offset from the first outer tube discharge ports in an axial direction of the first outer tube and second outer tube.

20. The system of claim 15, further comprising:
an airbag or cushion,
wherein the airbag or cushion is configured to receive gas from the inner tube via the one or more outer tube discharge ports.

21. A garment comprising:
the system of claim 15; and
an airbag or cushion,
wherein the airbag or cushion is configured to receive gas from the inner tube via the one or more outer tube discharge ports.

22. A system comprising:
an inflator having an inflator discharge port;
a flexible non-permeable inner tube configured to receive gas from the inflator via the inflator discharge port;
an outer tube surrounding the inner tube and defining an elongated chamber between the inner tube and the outer tube, and outer tube including a plurality of outer tube discharge ports; and
an end cap connecting an end of the inner tube opposite the inflator to an end of the outer tube opposite the inflator,
wherein the system is configured such that gas discharged from the inflator discharge port flows through the inner tube and passes through the elongated chamber defined by the outer tube before exiting the outer tube discharge ports.

23. The system of claim 22, further comprising:
an airbag or cushion,
wherein the airbag or cushion is configured to receive gas from the outer tube via the outer tube discharge ports.

24. A system comprising:
an inflator having an inflator discharge port;
a flexible permeable inner tube configured to receive gas from the inflator via the inflator discharge port; and
a flexible outer tube surrounding the inner tube and configured to receive gas from the inner tube, wherein the outer tube comprises an impermeable inner coating, and wherein the outer tube includes one or more outer tube discharge ports.

25. The system of claim 24, wherein the impermeable inner coating comprises polyurethane, natural rubber, and/or silicone.

26. A system comprising:
an inflator having an inflator discharge port;
a flexible permeable inner tube configured to receive gas from the inflator via the inflator discharge port;
a flexible outer tube surrounding the inner tube and configured to receive gas from the inner tube, the outer tube including one or more outer tube discharge ports; and
a sound absorption layer disposed between the inner tube and the outer tube.

27. The system of claim 26, wherein the sound absorption layer comprises fiberglass, aerogel, felt, aramid fiber, open-cell foam, and/or polybenzobisoxazole.

28. The system of claim 26, wherein the sound absorption layer comprises a permeable woven fabric.

* * * * *